United States Patent [19]

Miller

[11] Patent Number: 5,564,772

[45] Date of Patent: Oct. 15, 1996

[54] APPARATUS FOR RELEASABLY HOLDING A VEHICLE VISOR IN A RAISED STORAGE POSITION AND SPRING CLIP FOR USE THEREIN

[75] Inventor: Douglas C. Miller, Hersey, Mich.

[73] Assignee: Automotive Industries Manufacturing, Inc., Farmington Hills, Mich.

[21] Appl. No.: 299,733

[22] Filed: Sep. 1, 1994

[51] Int. Cl.$^6$ .................................................. B60J 3/02
[52] U.S. Cl. .......................... 296/97.12; 16/297; 16/321; 16/341; 16/342
[58] Field of Search ................................. 296/97.1, 97.9, 296/97.12, 97.13; 16/297, 321, 341, 342

[56] References Cited

U.S. PATENT DOCUMENTS

| | | | |
|---|---|---|---|
| 4,394,043 | 7/1983 | Moulding et al. | 296/97.9 |
| 4,500,131 | 2/1985 | Fleming | 296/97.12 |
| 4,828,313 | 5/1989 | Lanser et al. | 296/97.12 |
| 5,004,289 | 4/1991 | Lanser et al. | 296/97.12 |
| 5,139,303 | 8/1992 | Miller | 296/97.9 |

FOREIGN PATENT DOCUMENTS

| | | | |
|---|---|---|---|
| 339187 | 11/1990 | European Pat. Off. | 296/97.12 |

Primary Examiner—Andrew C. Pike
Attorney, Agent, or Firm—Brooks & Kushman P.C.

[57] ABSTRACT

A spring clip, an arm assembly including a pivot rod, and a clip housing are provided for a vehicle visor for providing holding torque when the vehicle visor is in its storage position against a headliner of the vehicle. The spring clip includes a bowed leaf-spring member having a crown portion which imposes a force against a flat formed on one side of the pivot rod. An equal opposing force is applied to a pair of spaced flats formed on the opposite side of the pivot rod by tab portions which extend from first and second legs which, in turn, extend from opposite sides of the leaf-spring member. In two embodiments, the pivot rod extends through D-shaped holes formed when the tab portions are bent inwardly from their respective legs to allow the pivot rod to pass through the body of the clip. The tab portions are preferably bent from their legs at approximately 90° to form surfaces which bear against the spaced flats of the pivot rod opposite the crown portion of the leaf-spring member. In some embodiments, the spring clip also incorporates one or more protrusions and/or recesses to positively engage the clip housing. In one embodiment, the clip housing includes a mounting portion for mounting the clip housing to the roof of the vehicle.

14 Claims, 2 Drawing Sheets

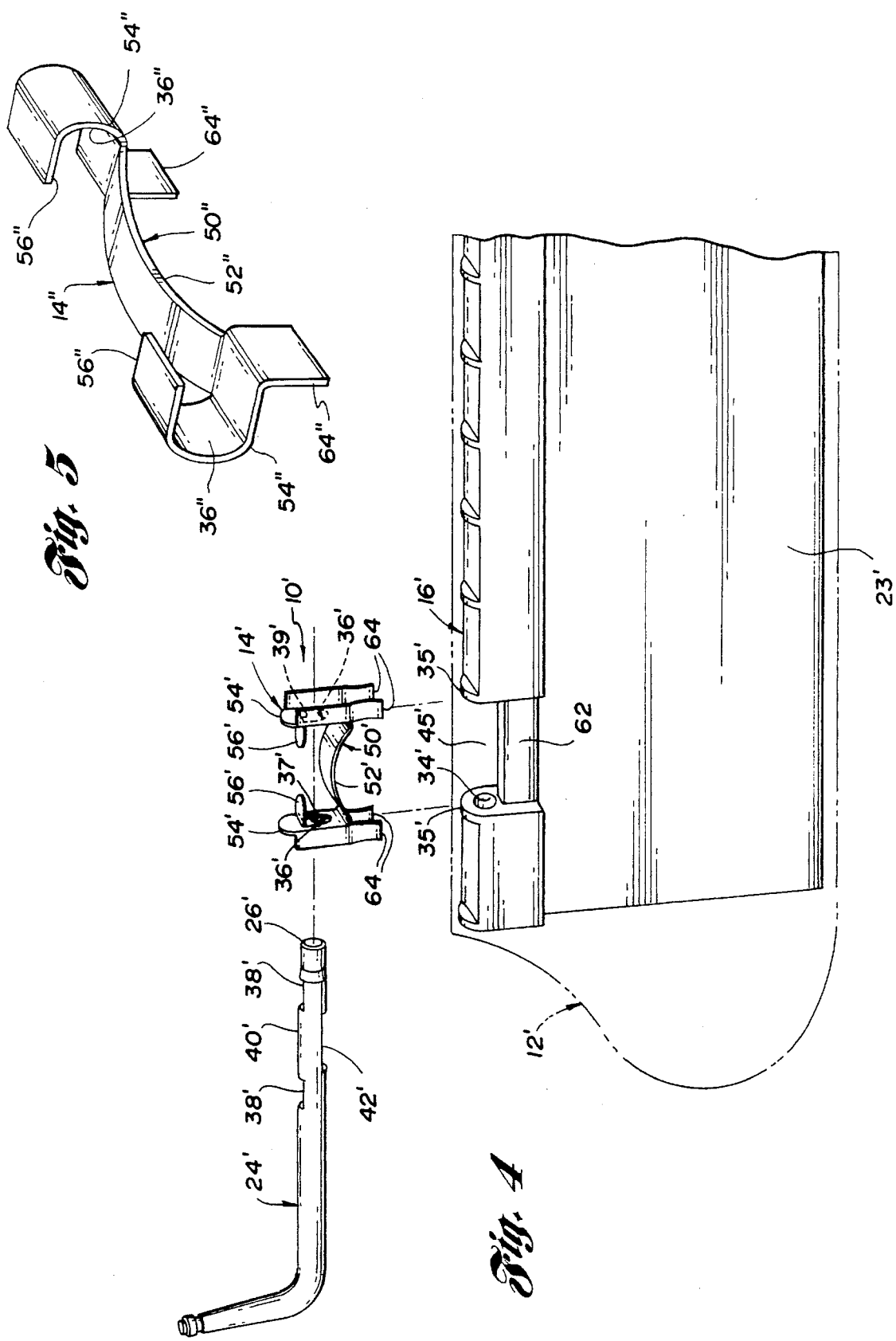

5,564,772

APPARATUS FOR RELEASABLY HOLDING A VEHICLE VISOR IN A RAISED STORAGE POSITION AND SPRING CLIP FOR USE THEREIN

TECHNICAL FIELD

This invention relates to apparatus for releasably holding a vehicle visor in a raised storage position and spring clip for use therein and, in particular, to apparatus for releasably holding a vehicle visor in a storage position and a spring clip for use therein wherein the spring clip includes a bowed leaf-spring member having a crown portion.

BACKGROUND ART

Apparatus for releasably holding a vehicle visor and spring clip for use therein oftentimes fail to exert the required torsional resistance to prevent the visor from rotating out of its raised storage position, especially when the vehicle is driven on rough roads.

Other apparatus for releasably holding the vehicle visor and associated spring clips are capable of providing enough torsional resistance. However, such apparatus and spring clips oftentimes: (1) exert a damaging amount of force to other elements of the visor in providing such torsional resistance; (2) take-up too much space; and/or (3) weigh too much.

The U.S. Pat. No. 4,500,131, to Fleming, discloses a visor control having an elastically deformable clamp of U-shaped cross-section with sides contacting a cylindrical pivot rod to hold the visor in position. The pivot rod has noncontinuous flats broken by lobes which align with recesses formed in the sides of the clamp. The sides of the clamp engage the edges of the flats as the rod is rotated within the clamp to provide a torque on the pivot rod as the sides abut the edge of the flats to provide snap-up action to move and hold the visor in a stored position.

The U.S. Pat. No. 4,828,313, to Lanser et al., discloses a visor control including a U-shaped spring clamp with integrally converging sides terminating in inwardly projecting rounded tips which circumscribe a portion of the visor rod in all positions of adjustment. The sides of the clamp include alternately staggered slots which cooperate with alternately staggered lobes and flats disposed along the longitudinal axis of the visor pivot rod for selectively camming the visor into a snap-up raised storage position and spreading the sides to frictionally hold the visor rod therebetween when the visor is lowered to a use position. A tang extends from a portion of at least one of the sides of the U-shaped clamp and extends into a recess in the body of the visor to hold the clamp against rotation.

The U.S. Pat. No. 5,139,303, to Miller, assigned to the assignee of the present invention, discloses a U-shaped clip having first and second arms within a cooperating clip housing integrally formed within the rear panel of the sun visor. A conduit is formed by the spring clip enabling the sliding of the pivot shaft due to both the clip housing and the spring clip. The clip housing is designed to cooperate with the pivot shaft to prestress one arm of the spring clip, thereby eliminating excess play between the spring clip and the sunvisor when the visor is rotated. The attachment mechanism is designed such that a snap-abut hook is properly received within a receiving hook, thereby effectively securing the sunvisor to the pivot shaft.

The U.S. Pat. No. 5,251,949, to Miller et al., also assigned to the assignee of the present invention discloses a mounting system including a pivot shaft with a generally circular cross section which cooperates with the sunvisor. The pivot shaft has a flat surface along one side of the shaft which provides a detent position for the sunvisor when in the retracted position. An annular groove is provided which is oriented in a plane generally perpendicular to the longitudinal axis of the shaft. A first clip is provided which cooperates with the shaft and sunvisor. The first clip has a first leg and a second leg such that either the first leg or the second leg has a protrusion which cooperates with the annular groove to prevent either the first leg or the second leg from locating the flat surface while allowing the other leg to locate the flat surface to obtain the detent position when the sunvisor is in the retracted position. A second clip cooperates with the first clip to securely fasten the first clip about the pivot shaft.

The U.S. Pat. No. 2,201,377, to Schoenheit, discloses a visor including a support, and a shield member pivoted to the support and movable relative thereto for adjustment of its position longitudinally of the axis of the pivot. A bowed leaf-spring having a crown engageable with the support and tensioned by movement of the shield member about the axis of the pivot holds the shield member in adjusted positions. A mechanism on the support releases the tension of the leaf-spring upon movement of the shield member to one position.

SUMMARY OF THE INVENTION

An object of the present invention is to provide apparatus for releasably holding a vehicle visor in a raised storage position and a spring clip for use therein wherein the spring clip exerts enough torsional resistance to prevent the visor from rotating out of its storage position while driving on rough roads, while at the same time without exerting a damaging amount of force to other elements of the visor.

In carrying out the above object and other objects of the present invention, an apparatus for releasably holding a vehicle visor in a raised storage position is provided. The apparatus includes a generally cylindrical pivot rod for pivotally mounting the visor to the vehicle for adjustable movement between the storage position and a lowered sun-shading position. The pivot rod has nonflat sides, a longitudinal axis, and has formed on a first surface thereof a pair of longitudinally spaced flats defining a lobe therebetween. The pivot rod has formed on a second surface opposite the lobe a longitudinally extending flat. Still further, the apparatus includes a spring clip. The apparatus also includes a clip housing adapted for connection to the visor to house the spring clip and for receiving the pivot rod. The spring clip is supported within the clip housing to receive the pivot rod. The spring clip includes a bowed leaf-spring member having a crown portion and first and second integral legs extending from opposite ends of the leaf-spring member. Each of the legs has an integral tab portion for compressibly engaging the pivot rod between the tab and the crown portions. The crown portion is aligned with the longitudinally extending flat and the tab portions are aligned with the longitudinally spaced flats when the pivot rod is in a predetermined rotational position with respect to the spring clip such that the crown portion engages the longitudinally extending flat and the tab portions engage the longitudinally spaced flats and the spring clip elastically holds the pivot rod and the visor in the storage position of the visor. When the visor is pivoted from the storage position, the tab and crown portions are elastically separated by the nonflat sides of the pivot rod to frictionally hold the pivot rod and the visor in the lowered sun-shading position.

In one embodiment of the invention, the clip housing includes a mounting portion for mounting the clip housing to the vehicle and a spring clip receiving portion connected to the mounting portion for receiving and retaining the spring clip to prevent relative rotation between the spring clip and the clip housing when the clip housing is connected to the visor by the pivot rod.

In another embodiment of the invention, the clip housing includes hollow channel members which define a spring clip receiving space therebetween and wherein the spring clip further includes integral flange members extending from the legs for engaging at least one of the channel members to prevent relative rotation between the spring clip and the clip housing. The pivot rod is received within the channel members so that the pivot rod is pivotally connected to the visor by the channel members.

Still further in carrying out the above object and other objects of the present invention, an elongated spring clip is provided for mounting to a visor and for receiving a pivot rod for providing a visor holding force. The spring clip includes a bowed leaf-spring member having a crown portion and first and second integral legs extending from opposite ends of the leaf-spring member. Each of the legs has an integral tab portion. The tab portions are spaced a distance from the crown portion to apply a compressible force to a pivot rod positioned therebetween. The tab portions and the crown portion cooperate with alternately staggered lobes and flats on the pivot rod to urge and releasably hold the visor in a raised storage position.

In one embodiment of the spring clip, each of the legs is tapered so that each of the legs is trapezoidal for preventing relative rotation on between the spring clip and an engaged clip housing.

In another embodiment of the spring clip, the spring clip further includes at least one integral flange extending from its respective leg for preventing relative rotation between the spring clip and an engaged clip housing.

In first and second embodiments, preferably, each of the legs includes an aperture therein for receiving a pivot rod in alignment between the tab portions and the crown portion such that each of the tab portions extends from its respective leg immediately adjacent its respective aperture. Also preferably, each of the apertures in these two embodiments is D-shaped.

In a third embodiment of the spring clip, each of the legs and its respective tab portion define a partially enclosed aperture to receive the pivot rod in alignment between the tab portions and the crown portion.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 4 is an exploded perspective view, partially broken away, of a second embodiment of apparatus and a spring clip constructed in accordance with the present invention with a cardboard and fabric covering illustrated by phantom lines; and FIG. 5 is an enlarged perspective view of a third embodiment of a spring clip constructed in accordance with the present invention.

BEST MODE FOR CARRYING OUT THE INVENTION

Figure 1:
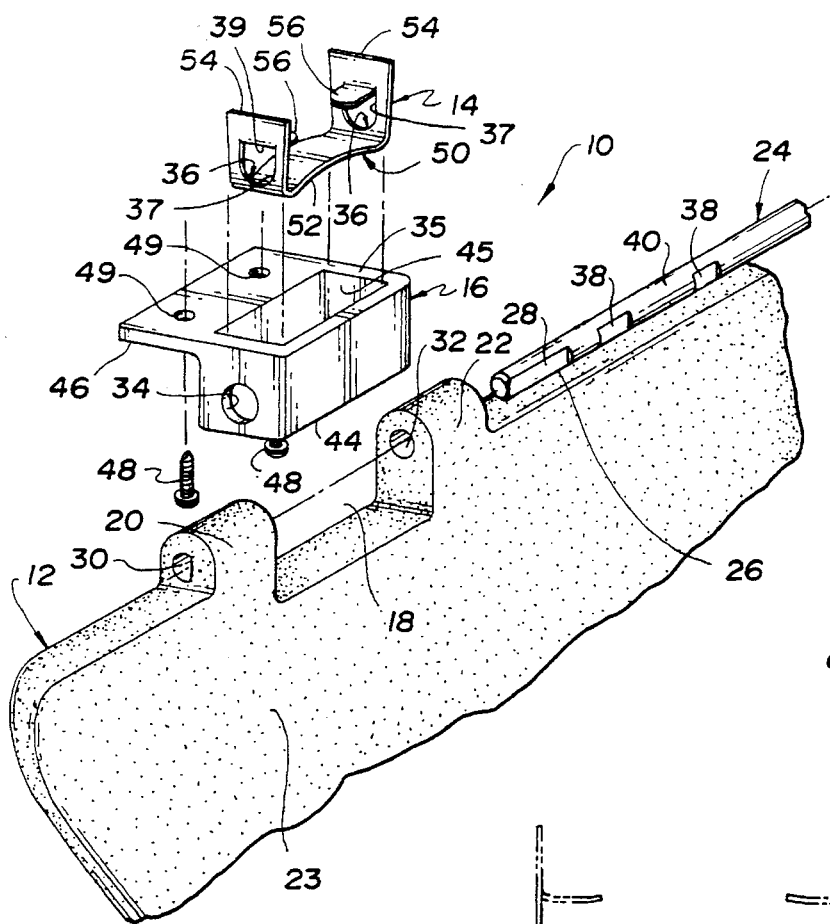
FIG. 1 is an exploded perspective view, partially broken away, of a first embodiment of apparatus and a spring clip constructed in accordance with the present invention.

Referring now to FIG. 1, there is illustrated at 10 an apparatus for releasably holding a vehicle visor, generally indicated at 12, in a raised storage position. The apparatus 10 includes a spring clip, generally indicated at 14, and a clip housing, generally indicated at 16. The clip housing 16 is located within a space 18 formed between a pair of hollow mounting bosses 20 and 22, respectively, formed on a visor blade 23 of the visor 12.

In general, the embodiment of FIG. 1 is intended for use with a secondary visor blade such as the visor blade 23 which does not pivot away from a windshield to a side window. The opposite end of the visor blade 23 would incorporate apparatus identical to the apparatus 10.

The clip housing 16 is pivotally connected to the visor 12 by a pivot rod, generally indicated at 24. The pivot rod 24 includes a free end portion 26 having a flat side 28 which is received within a complementarily shaped aperture 30 formed within the mounting boss 20 after insertion through an aperture 32 formed through the mounting boss 22. The pivot rod 24 also extends through a pair of aligned apertures 34 (only one of which is shown) formed through spaced apart walls 35 of the clip housing 16 and through apertures, generally indicated at 36, formed through the spring clip 14 when the spring clip 14 is located within the clip housing 16. The flat side 28 of the free end portion 26 prevents relative rotation between the pivot rod and the visor 12, but allows relative rotation between the clip housing 16 and the visor 12.

The pivot rod 24 also includes a first surface having a pair of longitudinally spaced flats 38 defining a lobe 40 therebetween. On a surface of the pivot rod 24 opposite the lobe 40 is formed therein a longitudinally extending flat 42.

The spring clip 14 is disposed within a space 45 formed within a spring clip-receiving portion 44 of the clip housing 16. Integrally formed with the spring clip receiving portion 44 is a mounting portion 46. A pair of mounting screws 48 extend through holes 49 formed through the mounting portion 46 to secure the clip housing 16 to a roof of the vehicle.

The spring clip 14 includes a bowed leaf-spring member, generally indicated at 50, having a central crown portion 52. The spring clip 14 also includes first and second integral legs 54 which extend from opposite ends of the leaf-spring member 50. Each of the legs has an integral tab portion 56 which is preferably stamped and bent out of its corresponding leg 54 to form its respective adjacent aperture 36. Each of the apertures 36 includes a curved portion 37 and a flat portion 39 immediately adjacent its tab portion 56. Preferably, the apertures 36 are D-shaped. However, the apertures 36 could have a slightly different shape to gain additional material in the legs 54 immediately adjacent their tab portions 56.

Figure 2:
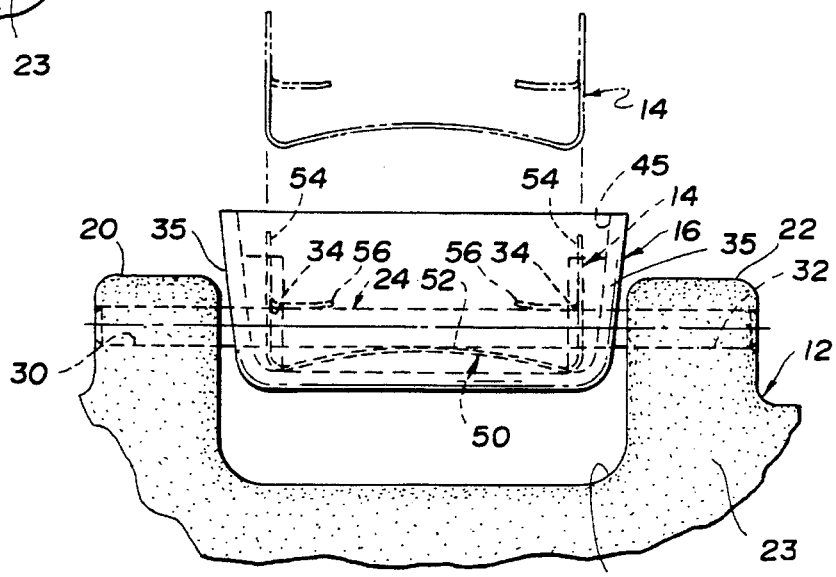
FIG. 2 is a side elevational view, partially broken away, of the apparatus and spring clip of FIG. 1 with a load position of the spring clip illustrated by phantom lines.
Figure 3:
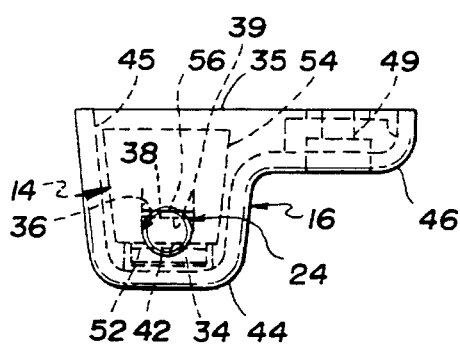
FIG. 3 is an end view, partially broken away, of the apparatus and spring clip of FIG. 1 with the flats of the pivot rod in a detent position.

Referring now to FIGS. 2 and 3, the tab portions 56 compressibly engage the pivot rod 24 between the tab and crown portions 56 and 52, respectively. The crown portion 52 of the leaf-spring member 50 is aligned with the longitudinally extending flat 42 and the tab portions 56 are aligned with the longitudinally spaced flats 38 (not shown in FIGS. 2 and 3) when the pivot rod 24 is in a predetermined rotational position with respect to the spring clip 14 as illustrated in FIG. 3. In this position, the crown portion 52 engages the longitudinally extending flat 42 and the tab portions 56 engage the longitudinally spaced flats 38 so that the spring clip 14 elastically holds the pivot rod 24 and the visor 12 in the storage position. When the visor 12 is pivoted from the storage position, the tab and crown portions 56 and 52, respectively, are elastically separated by the nonflat sides of the pivot rod 24 which frictionally hold the pivot rod 24 and the visor 12 in a lowered sun-shading position.

Still referring to FIG. 3, there is illustrated how the spring clip-receiving portion 44 of the clip housing 16 receives and retains the spring clip 14 to prevent relative rotation between the spring clip 14 and the clip housing 16. In particular, each of the legs 54 of the spring clip 14 is tapered so that each of the legs is trapezoidal in shape. The space 45 of the spring clip-receiving portion 44 is complementarily shaped for receiving each of the legs 54 to prevent relative rotation between the spring clip 14 and the clip housing 16.

Referring now to FIG. 4, there is illustrated a second embodiment of apparatus, generally indicated at 10', and a spring clip, generally indicated at 14', constructed in accordance with the present invention. Parts of the second embodiment which have the same or similar functions to parts of the first embodiment have the same reference numeral but have a single prime designation.

The embodiment of FIG. 4 is particularly useful with a conventional side pivoting visor, as generally indicated partially in phantom at 12'. The visor 12' typically includes a hard-board visor body 23' which is fixedly secured to a plastic or metal clip housing, generally indicated at 16', which includes a pair of longitudinally spaced hollow channel members 35' and a channel member 62 in which the visor body 23' is inserted and retained therein. The channel members 35' and the channel member 62 define a spring clip receiving space 45' therebetween.

Similar to the first embodiment, the spring clip 14' has legs 54' and tab portions 56' which are cut and bent out of their respective legs 54' to form apertures generally indicated at 36'. Each of the apertures 36' includes a curved portion or 37' and a flat portion or 39' immediately adjacent its tab portion 56'. Preferably, the apertures 36' are D-shaped. However, the apertures 36' could have a slightly different shape to gain additional material in the legs 54 and 54' immediately adjacent their tab portions.

The spring clip 14' includes integral flange members 64 between which the channel members 35' are secured to prevent relative rotation between the spring clip 14' and the clip housing 16'. In the embodiment of FIG. 4, a pivot rod 24' is received within apertures 34' (only one of which is shown) in the channel members 35' so that the pivot rod 24' is pivotally connected to the visor 12' by the channel members 35' of the clip housing 16'.

As illustrated in FIG. 4, the flange members 64 extend outwardly from their legs 54' so as to receive and retain their respective channel members 35' therebetween. The integral flanges 64 are bent to eliminate excess play which causes snapping noises as the visor is moved.

The visor mounting arm or pivot rod 24' and the spring clip 14', as well as their components, are similar to their counterparts of the first embodiment. However, the legs 54' are not trapezoidal-shaped and the free end portion 26' of the pivot rod 24' does not have a flat.

Referring now to FIG. 5, there is illustrated a third embodiment of a spring clip, generally indicated at 14", constructed in accordance with the present invention. Again, parts of the spring clip 14" which have the same or similar function as the parts of the spring clips 14 and 14' are given the same reference numeral but have a double prime designation. For example, the spring clip 14" includes a bowed leaf-spring member 50" having a crown portion 52". First and second integral legs 54" extend from opposite ends of the leaf-spring member 50". Each of the legs 54" has an integral tab portion 56" extending therefrom wherein the tab portions 56" are spaced a distance from the crown portion 52" to apply a compressible force to a pivot rod (not shown) positioned therebetween. The tab portions 56" and the crown portion 52" cooperate with alternately staggered lobes and flats on a pivot rod (not shown) to urge and releasably hold a visor (also not shown) in a raised storage position. Integral flanges 64" extend from their respective legs 54" for preventing relative rotation between the spring clip 14" and an engaged visor or clip housing (not shown).

Each of the legs 54" and its respective tab portion 56" define a partially enclosed, C-shaped aperture 36" for receiving a pivot rod in alignment between the tab portions 56" and the crown portion 52". In the three above-noted embodiments, each of the top portions 56, 56', and 56" extends from its respective leg 54, 54', and 54" at an angle of approximately 90 degrees.

The spring clip 14" has advantages over the spring clips 14 and 14' in that the spring clip 14" requires less clearance from the top rounded profile of a visor (not shown).

The advantages of the various embodiments of the apparatus and spring clip for use therein are numerous. For example, the leaf-spring type of clip illustrated at 14, 14', and 14" exert enough torsional resistance to prevent its respective visor from rotating out of its storage position while driving on rough roads. This is accomplished without exerting a damaging amount of force to other elements of the visor. The design also exhibits material and weight savings over alternative designs.

While the best mode for carrying out the invention has been described in detail, those familiar with the art to which this invention relates will recognize various alternative designs and embodiments for practicing the invention as defined by the following claims.

What is claimed is:

1. Apparatus for releasably holding a vehicle visor in a raised storage position, the apparatus comprising:

a generally cylindrical pivot rod for pivotally mounting the visor to a vehicle for adjustable movement between the storage position and a lowered sun-shading position, the pivot rod having nonflat sides, a longitudinal axis, and having formed on a first surface thereof a pair of longitudinally spaced flats defining a lobe therebetween, the pivot rod having formed in a second surface opposite the lobe a longitudinally extending flat;

a spring clip; and a clip housing adapted for connection to the visor to house the spring clip and for receiving the pivot rod;

the spring clip being supported within the clip housing to receive the pivot rod, the spring clip including a bowed leaf-spring member having a curved crown portion bent into a curve, and first and second integral legs extending from opposite ends of the leaf-spring member, each of the legs having an integral substantially planar tab portion for compressibly engaging the pivot rod between the planar tab and the curved crown portions, the curved crown portion being aligned with the longitudinally extending flat and the planar tab portions being aligned with the longitudinally spaced flats when the pivot rod is in a predetermined rotational position with respect to the spring clip, such that the curved crown portion engages the longitudinally extending flat and the planar tab portions engage the longitudinally spaced flats and the spring clip elastically holds the pivot rod and the visor in the storage position of the visor, and when the visor is pivoted from the storage position, the planar tab and curved crown portions are elastically separated by the nonflat sides of the pivot rod to frictionally hold the pivot rod and visor in the lowered sun-shading position.

2. The apparatus as claimed in claim 1 wherein the clip housing includes hollow channel members defining a spring clip-receiving space therebetween, and wherein the spring clip further includes integral flange members extending from the legs for engaging at least one of the channel members to prevent relative rotation between the spring clip and the clip housing, wherein the pivot rod is received within the channel members and wherein the pivot rod is pivotally connected to the visor by the channel members.

3. The apparatus as claimed in claim 1 wherein the clip housing includes a mounting portion for mounting the clip housing to the vehicle and a spring clip-receiving portion connected to the mounting portion for receiving and retaining the spring clip to prevent relative rotation between the spring clip and the clip housing, wherein the pivot rod is received within the spring clip-receiving portion.

4. Apparatus for mounting to a visor and for receiving a pivot rod for providing a visor holding force, the apparatus comprising:

a spring clip; and a clip housing adapted for connection to the visor to house the spring clip and adapted to receive the pivot rod;

the spring clip including a bowed, leaf-spring member having a curved crown portion bent into a curve and first and second integral legs extending from opposite ends of the leaf-spring member, each of the legs having an integral, planar tab portion, the planar tab portions being spaced a distance from the curved crown portion to apply a compressible force to the pivot rod positioned therebetween, the planar tab portions and the crown portion cooperating with alternately staggered lobes and flats on the pivot rod to urge and releasably hold the visor in a raised storage position;

wherein each of the legs includes an aperture therein for receiving the pivot rod in alignment between the tab portions and the crown portion, each of the tab portions extending from its respective leg immediately adjacent its respective aperture.

5. The apparatus as claimed in claim 4 wherein each of the apertures includes a curved portion and a flat portion immediately adjacent its respective tab portion.

6. The apparatus as claimed in claim 5 wherein each of the apertures is D-shaped.

7. Apparatus for mounting to a visor and for receiving a pivot rod for providing a visor holding force, the apparatus comprising:

a spring clip; and a clip housing adapted for connection to the visor to house the spring clip and adapted to receive the pivot rod;

the spring clip including a bowed, leaf-spring member having a curved crown portion bent into a curve and first and second integral legs extending from opposite ends of the leaf-spring member, each of the legs having an integral, planar tab portion, the planar tab portions being paced a distance from the curved crown portion to apply a compressible force to the pivot rod positioned therebetween, the planar tab portions and the crown portion cooperating with alternately staggered lobes and flats on the pivot rod to urge and releasably hold the visor in a raised storage position;

wherein each of said legs is tapered so that each of the legs is trapezoidal and wherein the clip housing includes complementary shaped receiving portions for receiving each of the legs to prevent relative rotation between the spring clip and the clip housing.

8. Apparatus for releasably holding a vehicle visor in a raised storage position, the apparatus comprising:

a generally cylindrical pivot rod for pivotally mounting the visor to a vehicle for adjustable movement between the storage position and a lowered sun-shading position, the pivot rod having nonflat sides, a longitudinal axis, and having formed on a first surface thereof a pair of longitudinally spaced flats defining a lobe therebetween, the pivot rod having formed in a second surface opposite the lobe a longitudinally extending flat; and a spring clip adapted for connection to the visor for receiving the pivot rod, the spring clip including a bowed leaf-spring member having a curved crown portion bent into a curve and a pair of substantially planar tab portions integrally formed at opposite ends of the leaf-spring member for compressibly engaging the pivot rod between the planar tab and curved crown portions, the curved crown portion being aligned with the longitudinally extending flat and the planar tab portions being aligned with the longitudinally spaced flats when the pivot rod is in a predetermined rotational position with respect to the spring clip, such that the curved crown portion engages the longitudinally extending flat and the planar tab portions engage the longitudinally spaced flats and the spring clip elastically holds the pivot rod and the visor in the storage position of the visor, and when the visor is pivoted from the storage position the planar tab and curved crown portions are elastically separated by the nonflat sides of the pivot rod to frictionally hold the pivot rod and the visor in the lowered sun-shading position.

9. The apparatus as claimed in claim 8 wherein the pivot rod includes a free end portion having a flat side for reception within a complementarily shaped hole formed in a structure mounted on the visor to prevent relative rotation through the pivot rod and the visor.

10. An elongated spring clip for mounting to a visor and for receiving a pivot rod for providing a visor-holding force, the spring clip comprising:

a bowed leaf-spring member having a curved crown portion bent into a curve; and first and second integral legs extending from opposite ends of the leaf-spring member, each of the legs having an integral, substantially planar tab portion, the planar tab portions being spaced a distance from the curved crown portion to apply a compressible force to the pivot rod positioned therebetween, the planar tab portions and the curved crown portion cooperating with alternately staggered lobes and flats on the pivot rod to urge and releasably hold the visor in a raised storage position;

wherein each of the legs includes an aperture therein for receiving the pivot rod in alignment between the tab portions and the crown portion, each of the tab portions extending from its respective leg immediately adjacent its respective aperture.

11. The spring clip as claimed in claim 10 wherein each of the apertures includes a curved portion and a flat portion immediately adjacent its respective tab portion.

12. The spring clip as claimed in claim 11 wherein each of the apertures is D-shaped.

13. An elongated spring clip for mounting to a visor and for receiving a pivot rod for providing a visor-holding force, the spring clip comprising:

a bowed leaf-spring member having a curved crown portion bent into a curved; and first and second integral legs extending from opposite ends of the leaf-spring member, each of the legs having an integral, substantially planar tab portion, the planar tab portions being spaced a distance from the curved crown portion to apply a compressible force to the pivot rod positioned therebetween, the planar tab portions and the curved crown portion cooperating with alternately staggered lobes and flats on the pivot rod to urge and releasably hold the visor in a raised storage position;

wherein each of said legs is tapered so that each of the legs is trapezoidal for preventing relative rotation between the spring clip and an engaged clip housing.

14. An elongated spring clip for mounting to a visor and for receiving a pivot rod for providing a visor-holding force, the spring clip comprising:

a bowed leaf-spring member having a curved crown portion bent into a curve; and first and second integral legs extending from opposite ends of the leaf-spring member, each of the legs having an integral, substantially planar tab portion, the planar tab portions being spaced a distance from the curved crown portion to apply a compressible force to the pivot rod positioned therebetween, the planar tab portions and the curved crown portion cooperating with alternately staggered lobes and flats on the pivot rod to urge and releasably hold the visor in a raised storage position;

wherein each of the tab portions extends from its respective leg at an angle of approximately 90°.

* * * * *